United States Patent [19]

Sordello et al.

[11] Patent Number: 5,507,310
[45] Date of Patent: Apr. 16, 1996

[54] SYSTEM OF PLUMBING FOR RECREATIONAL VEHICLES

[75] Inventors: David L. Sordello, East Boston; Carl A. Engstrom, Worcester, both of Mass.

[73] Assignee: Watts Investment Company, Wilmington, Del.

[21] Appl. No.: 421,954

[22] Filed: Apr. 14, 1995

Related U.S. Application Data

[63] Continuation-in-part of Ser. No. 305,091, Sep. 13, 1994, Pat. No. 5,421,362.

[51] Int. Cl.⁶ .............................. A01M 7/00; F16K 49/00
[52] U.S. Cl. .......................... 137/351; 137/563; 137/597; 137/899; 137/334
[58] Field of Search ...................... 137/351, 563, 137/565, 569, 899, 334, 341, 337, 605, 607, 597

[56] References Cited

U.S. PATENT DOCUMENTS

| | | | |
|---|---|---|---|
| 1,377,256 | 5/1921 | La Bour | 137/569 |
| 4,367,785 | 1/1983 | Allen | 137/563 |
| 4,531,538 | 7/1985 | Sandt et al. | 137/334 |
| 5,057,214 | 10/1991 | Morris | 137/597 |
| 5,351,337 | 9/1994 | Deutch | 137/563 |
| 5,421,362 | 6/1995 | Sordello | 137/351 |

Primary Examiner—A. Michael Chambers
Attorney, Agent, or Firm—Fish & Richardson

[57] ABSTRACT

The invention provides an improved system of plumbing for transportation conveyances including over-the-road, domestic vehicles, railway cars and yachts. The system includes a compact, unitary water distribution manifold for distributing water from an external supply of water. The manifold defines a system of conduits having inlets and outlets for connecting the conduits alternatively to a pressurized external water supply, or, where the external supply is not pressurized, to a pump, with a valve for draining water from the manifold and connected piping, e.g. for cold weather storage.

25 Claims, 6 Drawing Sheets

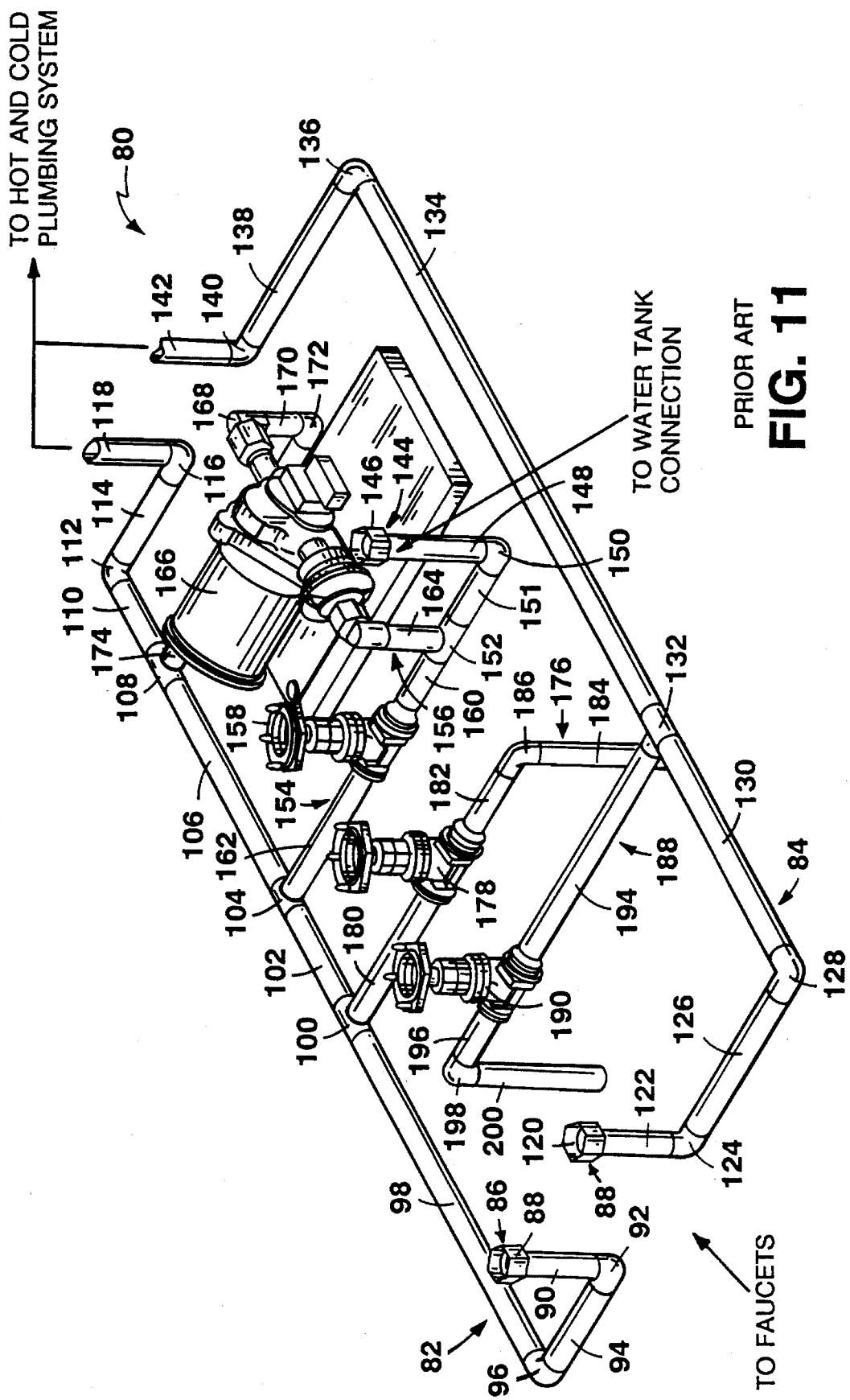

SYSTEM OF PLUMBING FOR RECREATIONAL VEHICLES

CROSS REFERENCE

This application is a continuation-in-part of patent application Ser. No. 08/305,091, filed on Sep. 13, 1994, now U.S. Pat. No. 5,421,362 issued Jun. 6, 1995, the complete disclosure of which is incorporated herein by reference.

BACKGROUND OF THE INVENTION

The invention relates to plumbing systems for transportation conveyances, including over-the-road vehicles, railway cars and recreational boats (e.g., yachts).

Over-the-road domestic vehicles, such as motor homes, travel trailers and the like, are typically equipped with a system of plumbing for distribution of water from an external source to different locations within the vehicle, e.g. kitchen, washroom, etc. The system of plumbing in more comfortable vehicles will often include a heater for delivery of hot water. In many instances, the plumbing system is adapted for connection to an external source of water supply under pressure, e.g., as available in most camping areas. The plumbing system will also generally include an auxiliary pump for generating pressure for delivery of water throughout the system in cases where the external source is not pressurized, e.g. water supplied from a tank, well or, more remotely, from a natural stream or pond. Since an over-the-road vehicle is often stored in an unheated area during the off season, the plumbing system most typically will include means for draining the pipes, as required in colder climates to avoid damage to the system, e.g. due to freezing. After the plumbing system is drained, a non-toxic anti-freeze may be added to the system for added protection against freezing.

SUMMARY OF THE INVENTION

The invention provides an improved system of plumbing for transportation conveyances (e.g., over-the-road domestic vehicles, railway cars, and recreational boats) including a compact, unitary manifold structure for distributing water from an external supply of water. The manifold defines a system of conduits having inlets and outlets for connecting the conduits to a pressurized external water supply, or, where the external supply is not pressurized, for connecting the conduits to a pump. The manifold further includes a shuttle valve coupled to the conduits which is movable between several positions to allow filling a water storage tank coupled to the system of conduits, serving the system of conduits, and draining water from the manifold and connected piping, e.g. for cold weather storage.

The improved plumbing system of the invention thus provides the operator of, for example, a motor home arriving at a campsite and requiring running water (e.g., for drinking, washing, or toilet facilities) several easy-to-operate options.

In the fill mode, the shuttle valve is moved in a position so that water from an external supply can be provided (typically with a hose) through the conduit to fill a storage tank connected thereto. If the external supply is non-pressurized water, a pump connected between the pump inlet and outlet is used to circulate the water through the conduit to the storage tank. The external supply may also be a source of antifreeze which is provided to the storage tank and to the system of plumbing for winterizing the motor home. Once the tank is filled, the shuttle valve is moved into the serve mode to allow the water to be circulated through the conduit and on through the system of plumbing. Alternatively, if an external water supply is conveniently available, the supply is connected to the water distribution manifold and the system is operated in the serve mode. The shuttle valve is moved to a third position to drain the conduit of the manifold and the plumbing system to which it is connected, for example, when the motor home is winterized. As a result, after connecting the system to an external supply, usually through a hose, it need not be disconnected whether the supply is being used to fill the storage tank in the serve mode or in the fill mode.

Moreover, the unitary design of the system of plumbing of the invention, with the water distribution manifold, significantly reduces the number of piping joints, fittings, nipples and connected lengths of piping that are typical in conventional, prior art plumbing systems used in over-the-road domestic vehicles. The multi-position shuttle valve also reduces the number of valves otherwise required for bypassing the pump and draining the system of conduits. As a result, the reliability of the system is increased and the likelihood of leaks in the system is significantly reduced. The unitary compact design saves space and requires little or no maintenance.

According to one aspect of the invention, a system of plumbing for a transportation conveyance, with one or more inlets for connection to pressurized and non-pressurized sources of water and one or more outlets for delivery of water for consumption within the conveyance, comprises a water distribution manifold defining a system of conduits for flow of water therethrough, a shuttle valve comprising an elongated body and a set of spaced valve heads mounted therealong, the shuttle valve disposed within the water distribution manifold for movement among at least a first position, a second position and a third position for predetermined positioning of the valve heads relative to the system of conduits defined by the water distribution manifold, the system of conduits defining one or more inlets for connection to the pressurized and non-pressurized sources of water, a heater outlet for flow of water from the system of conduits toward a water heater, at least one utility outlet for flow of water from the system of conduits for consumption within the transportation conveyance, and a drain port for flow of water from the system of plumbing.

According to another aspect of the invention, a transportation conveyance has a system of plumbing with one or more inlets for connection to pressurized and non-pressurized sources of water and one or more outlets for delivery of water for consumption within the conveyance. The system of plumbing comprises a water distribution manifold defining a system of conduits for flow of water therethrough, a shuttle valve comprising an elongated body and a set of spaced valve heads mounted therealong, the shuttle valve disposed within the manifold for movement among at least a first position, a second position and a third position for predetermined positioning of the valve heads relative to surrounding conduit walls of the system of conduits, the system of conduits defining one or more inlets for connection to pressurized and non-pressurized sources of water, a heater outlet for flow of water from the system of conduits toward a water heater, at least one utility outlet for flow of water from the system of conduits for delivery for consumption within the transportation conveyance, and a drain port for flow of water from the system of plumbing.

Preferred embodiments of each aspect of the invention may include one or more of the following features. The shuttle valve, in first position, is adapted to permit flow of water from an inlet among the one or more inlets, through the system of conduits, toward a water storage tank; preferably, a first valve head is disposed in sealing engagement with a surrounding conduit wall of the water distribution manifold to resist flow of water within the system of conduits toward the drain port, and a second valve head is disposed in sealing engagement with a surrounding conduit wall of the water distribution manifold to resist flow of water from an inlet coupled to the water heater toward the drain port. The shuttle valve, in second position, is adapted to permit flow of an inlet among the one or more inlets, through the system of conduits, to the heater and utility outlets; preferably, a first valve head is disposed in sealing engagement with a surrounding conduit wall of the water distribution manifold to resist flow of water from the system of conduits toward the drain port and a third valve head is disposed in sealing engagement with a surrounding conduit wall of the water distribution manifold to resist flow of water from the system of conduits toward the inlet coupled to the non-pressurized source of water. The inlet may be connected to a pressurized or a non-pressurized source of water. The shuttle valve, in the third position, is adapted to permit flow of water from the system of conduits through the drain port; preferably, the first, second and third valve heads are spaced from sealing engagement with surrounding conduit walls of the water distribution manifold. The drain port is disposed at a lowest point of the system of conduits and the system of plumbing. A pump is mounted adjacent the water distribution manifold and defines a pump inlet and a pump outlet. The pump, upon actuation, is adapted to deliver water received at the pump inlet from the pump outlet under pressure. When the shuttle valve is in the first and second positions, the hot and cold water are isolated from each other by the valve heads and in the third position all conduits (hot and cold water) are allowed to drain through the drain port.

Other features and advantages of the invention will become apparent from the following detailed description of presently preferred embodiments, and from the claims.

BRIEF DESCRIPTION OF THE DRAWINGS

FIG. 11 is a diagrammatic view of a conventional, prior art plumbing system for a motor home vehicle.

DESCRIPTION OF THE PREFERRED EMBODIMENTS

Figure 1:
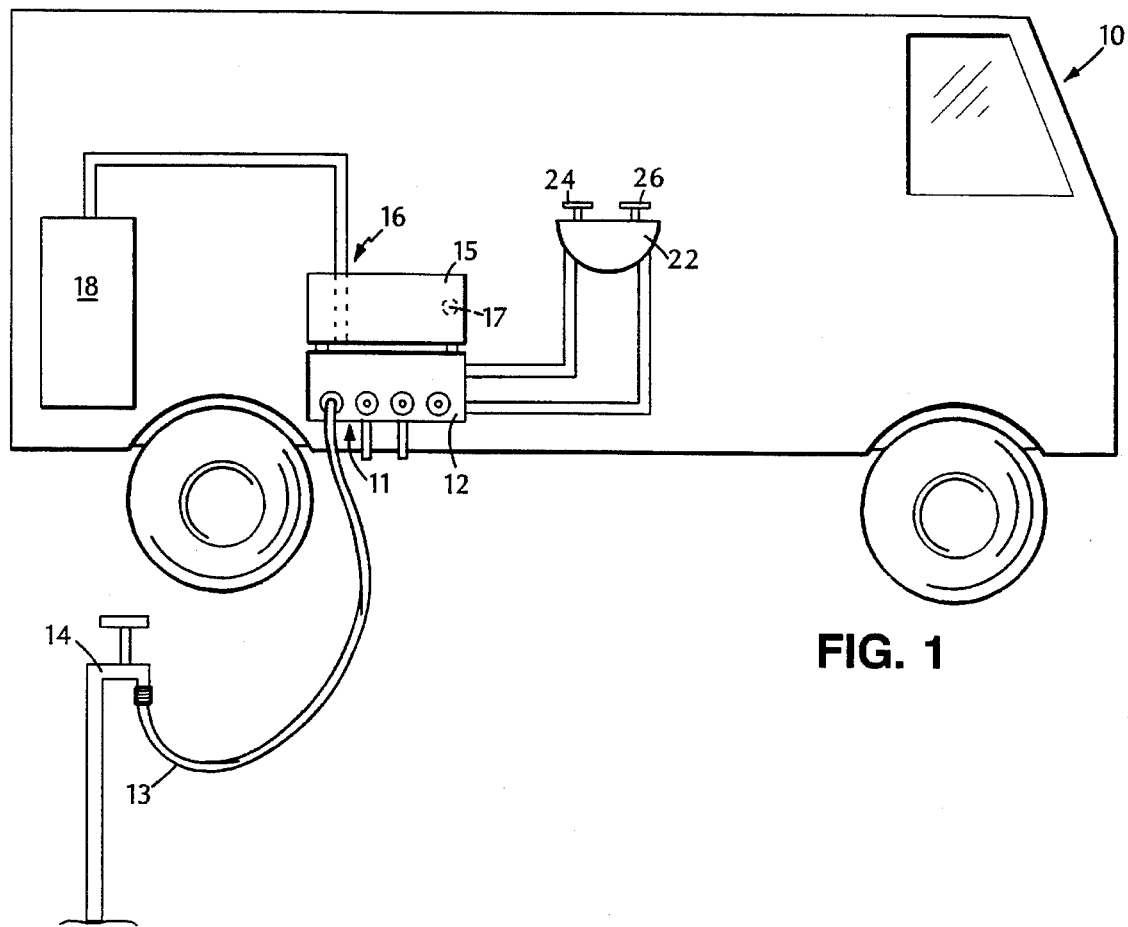
FIG. 1 is a diagrammatic view of a motor home vehicle having a system of plumbing, including a water distribution manifold, of the invention.

Referring to FIG. 1, an over-the-road domestic vehicle 10 (e.g., motor home) has a system of plumbing 11, including a compact, unitary water distribution manifold 12. The system of plumbing 11 is located along the lower portion of the body of vehicle 10 for receiving water through a hose 13 from an external supply 14 and distributing the water to various parts of plumbing 16 within vehicle 10. The water from external supply 14 is typically unheated and supplied from a pressurized system, although other sources for providing water to motor home 10 may not be pressurized, for example, tank supply or pond. As will be described in greater detail below, for circumstances where the water is supplied from a non-pressurized source, the system of plumbing 11 includes a pump circulation of the water through the plumbing system conduits. A hinged door 15 attached to vehicle 10 provides access to the water distribution manifold 12, and includes a locking mechanism 17 to limit access to inlets, outlets and valves.

The typical motor home 10 also includes a combination hot water heater/storage tank 18 connected to the system of plumbing 11 which receives cold water from the water distribution manifold 12 and provides the heated water back to the water distribution manifold for distribution to other parts of motor home 10, such as to a wash basin 22 in a kitchen or bathroom. Wash basin 22 includes cold and hot water faucets 24, 26 to deliver unheated and heated water, respectively, from water distribution manifold 12 through piping 28.

Figure 2:
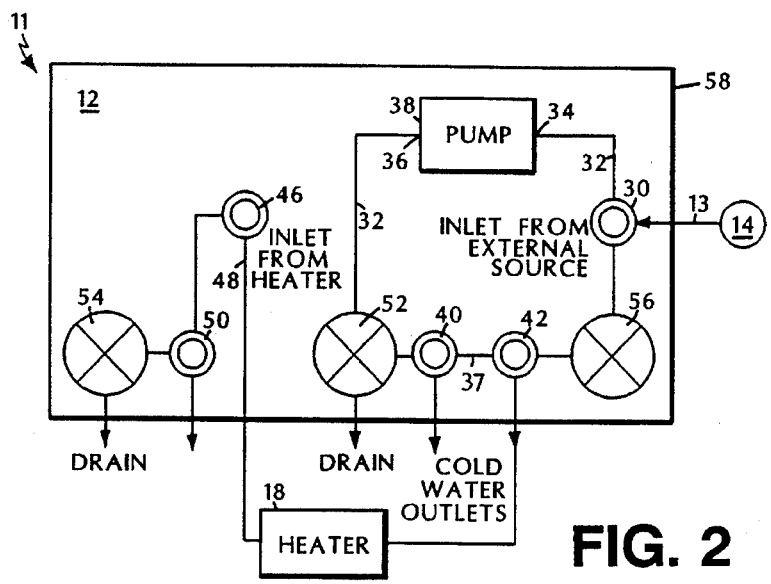
FIG. 2 is a schematic representation of one embodiment of a system of plumbing, including a water distribution manifold, of the invention.

Referring to the schematic representation of the system of plumbing 11 shown in FIG. 2, water distribution manifold 12 defines a conduit 32 with an inlet 30 for receiving unheated water from external water supply 14 into water distribution manifold 12. Conduit 32 extends between inlet and outlet ports 34, 36 of pump 38. The water distribution manifold 12 further defines conduit 36, with an outlet 40 providing cold water to piping leading to a cold water faucet 24 (FIG. 1) and an outlet 42 providing water to heater/storage unit 18. The cold water exiting via outlet 42 is returned as heated water to water distribution manifold 12 at an inlet 46, which feeds a heated water conduit 48. The heated water can then be provided back to the piping of the motor home 10 through an outlet 50, e.g., to hot water faucet 26 at wash basin 22 (FIG. 1).

Drain valves 52, 54 are also coupled to conduits 32, 48, respectively, to permit water to be drained from the system of plumbing, including water distribution manifold 12, and from the vehicle piping, e.g., when the motor home is winterized.

Figure 3:
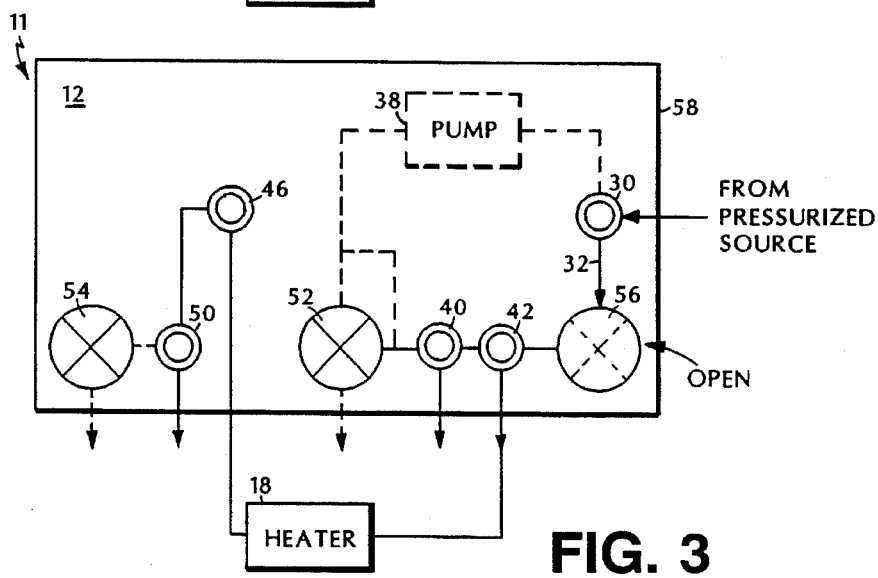
FIGS. 3 and 4 are schematic representations of a system of plumbing of the invention, respectively showing its operation from a pressurized water source and from a non-pressurized water source.
Figure 4:
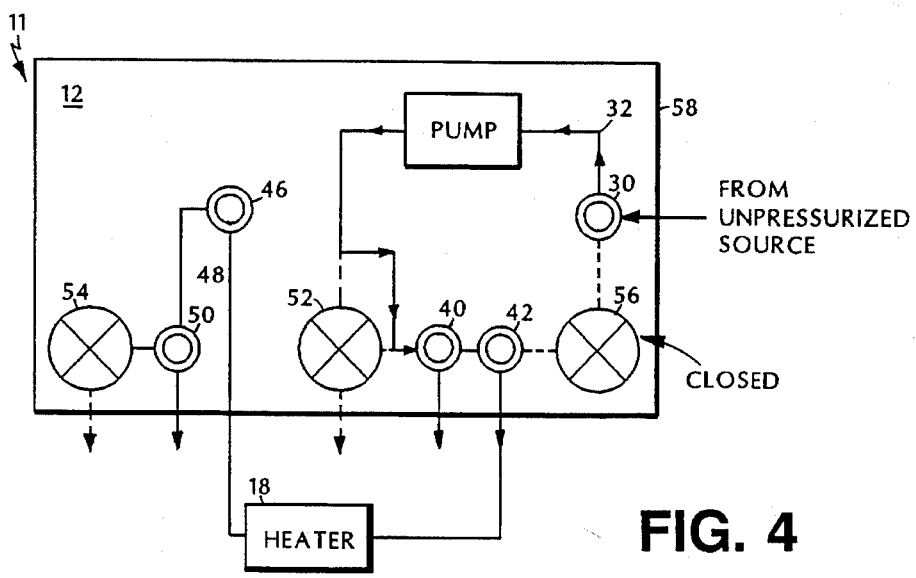

Referring to FIG. 3, a bypass valve 56 is coupled to conduit 32 at a position between inlet 30 and outlets 40, 42. Bypass valve 56 is opened when water from external supply 14 is pressurized to allow the water to flow directly from inlet 30 to outlets 40, 42, bypassing pump 38. Alternatively, referring to FIG. 4, if the external supply is not pressurized, bypass valve 56 is closed to cause the water from inlet 30 to flow to pump 38. (For clarity, unused portions of the plumbing system 11 are shown in dashed line in FIGS. 3 and 4.)

Figure 5:
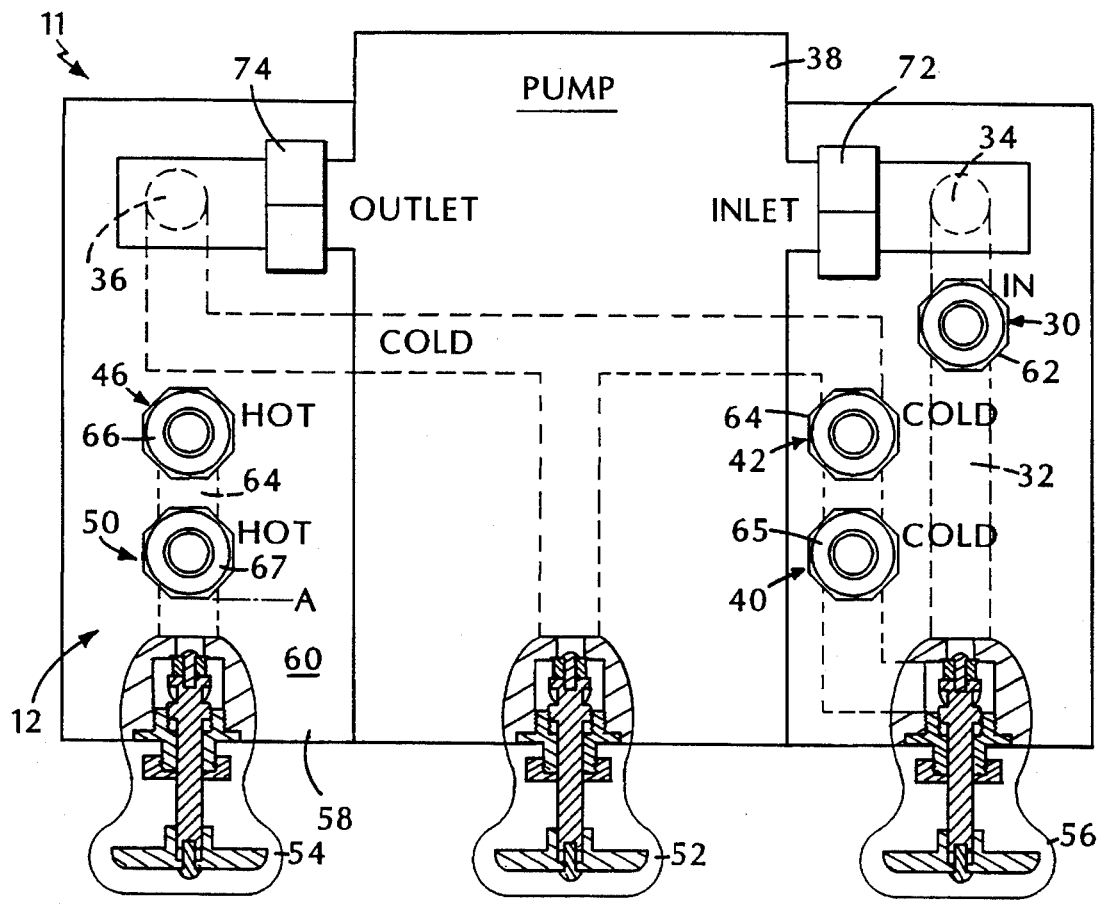
FIG. 5 is a top view, partially in cross-section, of a system of plumbing of the invention.
Figure 6:
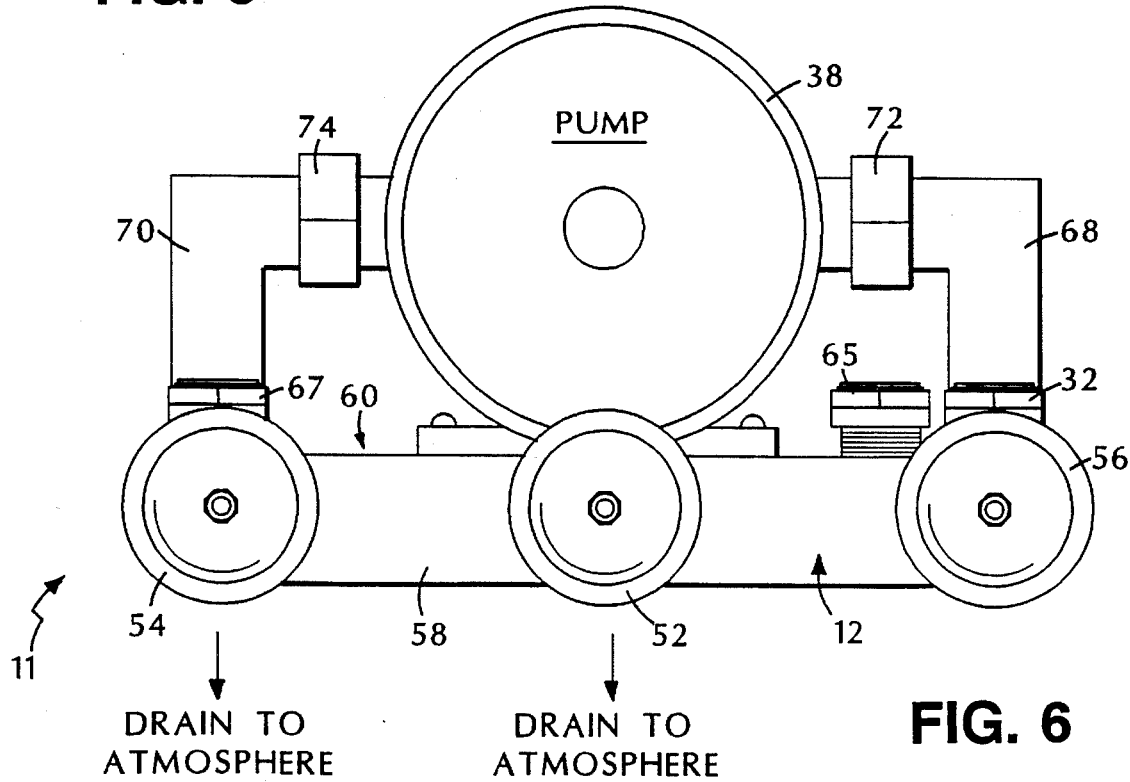
FIG. 6 is a side view of a system of plumbing of FIG. 5.
Figure 7:
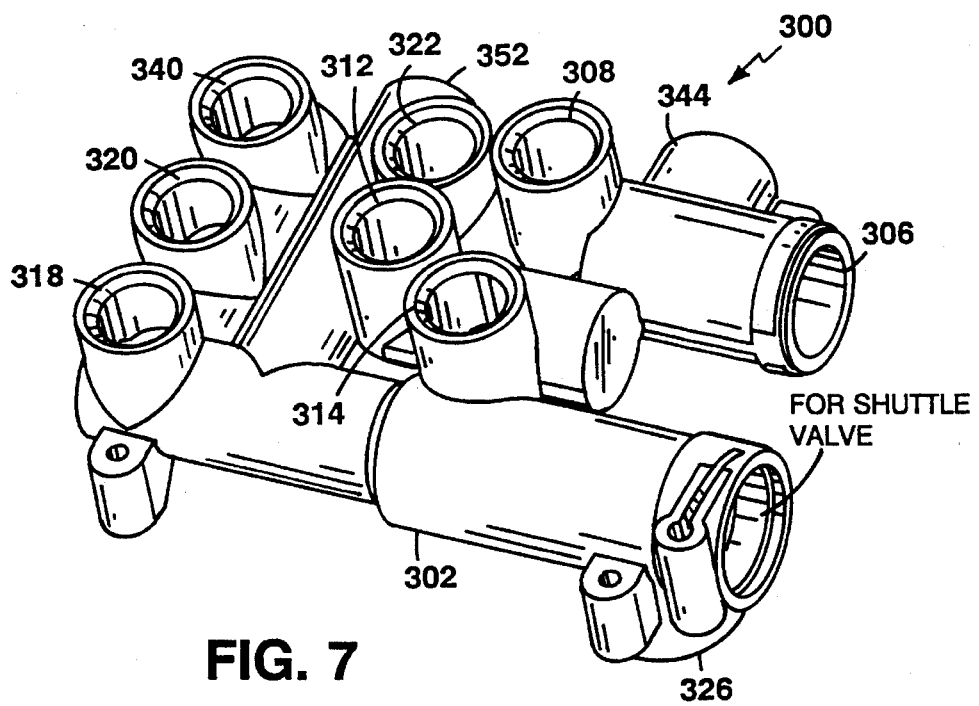
FIG. 7 is a perspective view of another embodiment of a system of plumbing of the invention.

Referring to FIGS. 5 and 6, the water distribution manifold 12 is a channelized housing 58, preferably an aluminum or molded plastic casting. Alternatively, housing 58 may be machined as separate halves of an assembly that are brazed or otherwise secured together. Housing 58 is relatively compact, e.g. less than about 10 inches long by 8 inches in diameter, with a top surface 60 of sufficient size for supporting a pump 38 of suitable size and type. A threaded coupling 62 is provided at inlet 30 for coupling a hose 13 leading to external water source 14. Threaded couplings 64, 65, 66, and 67 are similarly provided at outlets 40, 42, as well as hot water inlet and outlet 46, 50, respectively, each coupling extending from surface 60 of housing 58. Elbow joints 68, 70 extend from water distribution manifold 58 to mate with threaded couplings 72, 74 at the inlet and outlet, respectively, of pump 38.

Drain valves 52, 54 and bypass valve 56, e.g. screw-down stop valves, are easily accessible behind hinged lockable door 15 of vehicle 10 (FIG. 1), which covers the water distribution manifold 12.

Turning now to FIGS. 7, 8, 9 and 10, a presently preferred embodiment of a water distribution manifold 300 of the invention includes a unitary channelized aluminum or plastic housing 302 for distributing water to various parts of plumbing within a vehicle. The housing includes large diameter flow channels providing increased flow rates in a relatively low weight, compact design. The housing inlet and outlet ports have a logical layout and provide fast and easy connections to the rest of the plumbing system.

Figure 8:
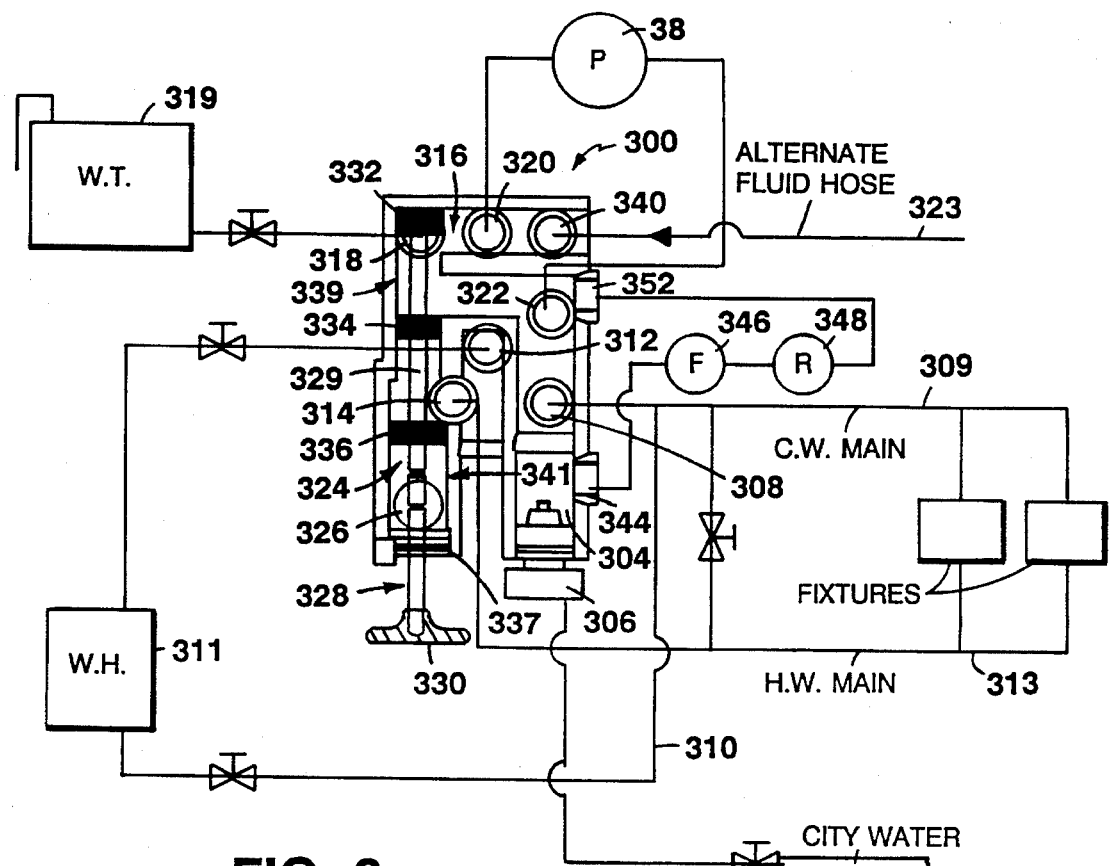
FIGS. 8, 9 and 10 are schematic representations of a system of plumbing of FIG. 7 showing its operation in fill, serve, and drain modes, respectively.

Referring first to FIG. 8, the housing 302 defines a main conduit 304 extending from an inlet 306 to a cold water outlet 308. Unheated water received at inlet 306 from an external pressurized water supply passes through main conduit 304 to outlet 308, and on to cold water main 309 leading to cold water fixtures within the vehicle (e.g., faucet 24 of FIG. 1). The unheated water is also directed through piping 310 at outlet 308 to an external water heater 311 where the water is heated and returned into manifold housing 302 at hot water inlet 312. The hot water, within the housing 302, passes from inlet 312 to outlet 314, and from there, through vehicle piping 313 to, for example, a hot water faucet 26 (FIG. 1) within the motor home 10.

A secondary conduit 316 communicates from the main conduit 304 to a coupling 318 leading to a water storage tank 319 within the vehicle. A pump inlet 320, defined in the secondary conduit 316, is connected to pump 38 and the storage tank for circulation of water back to main conduit 304 at pump outlet 322. An additional inlet coupling 340 permits connection of the pump 38 to an non-pressurized water source (e.g., lake or stream) via a fluid hose 323.

Drain conduit 324 is defined by housing 302 to connect both main conduit 304 and secondary conduit 316 to drain outlet 326 for draining water from the housing, e.g. for cold weather storage.

A shuttle valve 328 (also referred to as a "spool valve") has an elongated body 329, with an external handle 330. Spaced along the body are a set of valve heads 332, 334 and 336 sized for sealing engagement with the walls 339 of the secondary conduit 316 and walls 341 of the drain conduit 324 defined by the manifold housing 302. Each valve head generally includes an O-ring around its periphery to provide proper sealing with the walls. The shuttle valve also includes an elastomeric wiper seal 337 positioned at the proximal end of the elongated body 329 to prevent leakage from drain conduit 324. The shuttle valve is movable axially (arrow A) (FIG. 9) relative to the housing between three positions for allowing and resisting flow of water through selected conduits within the housing. A shuttle valve suitable for this application is described in U.S. Pat. No. 4,469,131, owned by the assignee of the present invention, the complete disclosure of which is incorporated herein by reference.

Housing 302 further includes an optional accessory outlet port 344 connected to a filter 346 and pressure regulator 348 to limit the pressure of the water provided to manifold 300. When this option is being used, a barrier is positioned within a tapered section 350 of main conduit 304 to prevent flow directly from inlet 306 to outlet 308. The water from inlet 306 is then circumvented to outlet port 344, through filter 346 and regulator 348 and back into the housing 302 at an accessory inlet port 352 where it can flow to cold water main 309. In applications where pressure regulation or filtering is not required ports 344 and 353 are blocked off.

Referring again to FIGS. 8, 9 and 10, operation of water distribution manifold 300 with shuttle valve 328 of the invention will now by described.

Referring first to FIG. 8, shuttle valve 328 is shown in the "fill" position, with main conduit 304 in communication with secondary conduit 316, and valve head 334 in sealed engagement with walls 341 of drain conduit 324 so that valve head 334 seals the main conduit 304 from communication with the drain conduit and isolates the hot water from the cold water. Similarly, valve head 336 is in sealed engagement with walls 341 to seal the hot water inlet 312 from the drain outlet 326. In this position, water is allowed to flow from an external (pressurized) water supply into the housing 302 through inlet 306, then through main conduit 304 into secondary conduit 316, and through outlet 318 into water storage tank. Pump 38 is constructed to prevent the flow of water from outlet to inlet when the pump is off. However, a check valve (not shown) may be provided in conduit 304 adjacent to the pump outlet 322 to resist flow of water from main conduit 304. A second check valve (not shown) may also be provided in conduit 304 adjacent inlet 306 to resist back flow of water from manifold housing when, e.g. a hose connected at inlet 306 is at a pressure level lower than pressure within the manifold.

To fill the storage tank from a non-pressurized source of water, the pump 38 is connected to inlet coupling 340. Pump 38 is activated to draw the water from line 323 into secondary conduit 316, through outlet 318 and into the water storage tank.

Figure 9:
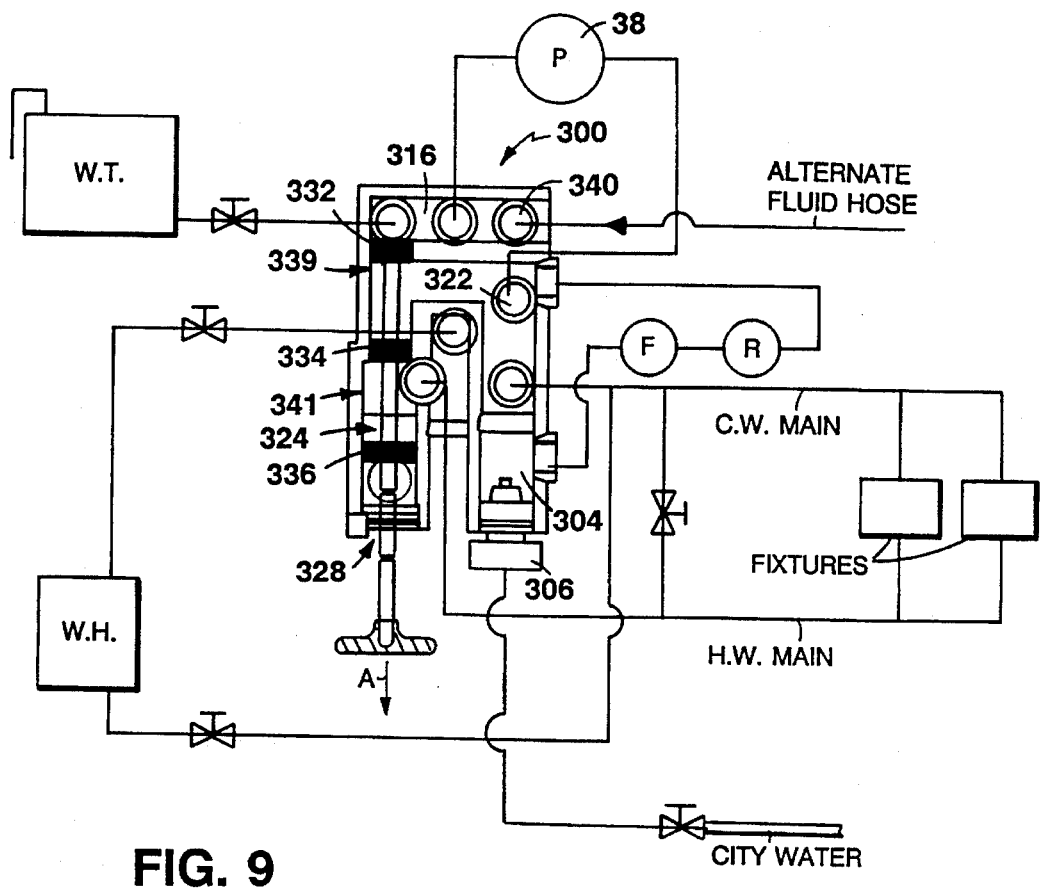

Once the water storage tank is filled, shuttle valve 328 is moved into "serve" position, shown in FIG. 9, by movement of the handle 330 (arrow A), to allow delivery of water within the motor home. In the "serve" mode, valve head 332 of the shuttle valve is in sealed engagement with walls 339 of secondary conduit 316 to prevent flow between the secondary conduit 316 and main conduit 304. Valve head 334 is in sealed engagement with walls 341 of drain conduit 324 to prevent flow between the main conduit 304 and the drain conduit 324. Valve head 336 also is in sealed engagement with walls 341 of drain conduit 324 to prevent flow from hot water outlet 314 to the drain conduit 324. In the "serve" mode, water can be provided from a pressurized external water supply through inlet 306, from an non-pressurized external water supply through inlet coupling 340, or from the water storage tank via pump outlet 322.

If pressurized water is supplied at inlet 306, the pump 38 is simply turned off, and the system is operated off of the external supply. Alternatively, if water from the storage tank or from an non-pressurized external supply is desired, the external pressurized water supply is turned off and the pump is turned on, with flow back through inlet 306 prevented by a check valve (the hose need not be disconnected).

Figure 10:
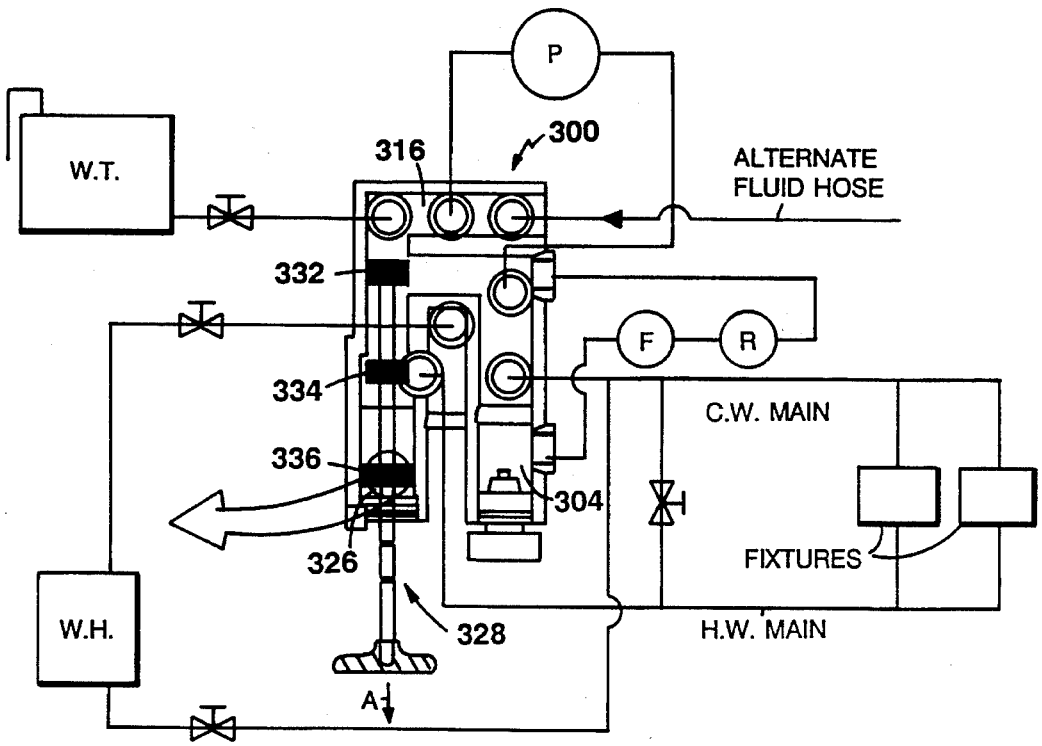

During winterization of the motor home vehicle, the shuttle valve 328 is moved into "drain" mode, shown in FIG. 10. Shuttle valve 328 is moved (arrow A) to place valve heads 332, 334, 336 are moved in the non-sealing positions show, thereby allowing water in main conduit 304 and in secondary conduit 316 to flow through drain conduit 324 to pass from the manifold housing via drain outlet 326. If the plumbing system is properly installed with the piping sloped downwardly toward the water distribution manifold 300, with drain outlet 326 at the lowest point, water from the entire system can be drained by opening all fixture valves within the vehicle and relying for the most part on gravity to force the water through the conduits. It is generally recommended that valves at fixtures within the motor home (e.g., faucets) be opened to eliminate air locks.

In most systems, however, a pressurized air supply is used to blow out the lines. Alternatively, or in conjunction with blowing out the lines, after the system has been properly drained, shuttle valve can be returned to the "serve" position (FIG. 9), and an antifreeze solution may be introduced into the conduits and storage tank via coupling 340 to secondary conduit 316. The pump can then be used to distribute the antifreeze throughout the piping system.

A latch mechanism (not shown) may be attached to the manifold housing 302 which, in conjunction with detents (not shown) formed on the elongated body 329 of the spool valve 328, allow the valve to be locked into one of the three positions.

For better appreciation of the simplicity and practicality of the system of plumbing 11, including the unitary water distribution manifold 12 or manifold 300, an example of a conventional, prior art plumbing system for a motor home vehicle is shown in FIG. 11. As is apparent from FIG. 11, the conventional, prior art plumbing system includes a substantial number of plumbing fixtures (e.g. T-joints and elbow joint) and piping of various lengths.

Conventional, prior art plumbing system 80 includes a cold water conduit 82 and a hot water conduit 84, each having ends connected between faucet outlets 86, 88, respectively, and a hot water heater and storage tank (not shown). Beginning at cold water faucet 86, cold water conduit 82 includes, in succession, a threaded coupling 88, piping 90, elbow joint 92, piping 94, elbow joint 96, piping 98, T-joint 100, piping 102, T-joint 104, piping 106, T-joint 108, piping 110, elbow joint 112, piping 114, elbow joint 116 and piping 118, which terminates at an inlet port of the heater. Similarly, starting at hot water faucet outlet 88, hot water conduit 84 includes, in succession, a threaded coupling 120, piping 122, elbow joint 124, piping 126, elbow joint 128, piping 130, T-joint 132, piping 134, elbow joint 136, piping 138, elbow joint 140 and piping 142, which leads to the outlet port of the heater.

Cold water from an external supply is introduced to plumbing system 80 at an inlet 144 having a threaded coupling 146 connected to piping 148 that extends to a T-joint 152 through an elbow joint 150 and piping 151. The T-joint 152 has branches 154, 156 which both connect to cold water conduit 82, depending on whether the external supply is pressurized or non-pressurized. Branch 154 includes a bypass valve 158, which is connected to T-joint 152 through piping 160. The bypass valve 158, in the open position, allows pressurized water to flow through bypass valve 158 and piping 162 connected to water conduit 82 at T-joint 104. If, on the other hand, the external supply of water is non-pressurized, bypass valve 152 is closed, and the water is forced to flow through branch 156. Branch 156 includes piping 164 connected to the inlet of a pump 166 and, from the outlet of pump 166, in succession, an elbow joint 168, piping 170, elbow joint 172 and piping 174 which connects to cold water conduit 82 at T-joint 108.

Cold water conduit 82, and the plumbing to which it is connected to, can be drained through drain branch 176 which includes a drain valve 178 connected to cold water conduit 82 at T-joint 100 through piping 180. When drain valve 178 is opened, water is allowed to drain through the valve and piping 182, 184 connected by an elbow joint 186.

Similarly, hot water conduit 84, and the plumbing to which it is connected to, is drained through a drain branch 188 having a drain valve 190 connected to hot water conduit 84 at T-joint 132 through piping 194. Opening drain valve 190 allows water from hot water conduit 84 to drain through piping 196, elbow joint 198 and drain piping 200.

Other embodiments are within the following claims. For example, it is appreciated that where reference has been made to connections to piping, flexible tubing may alternatively be used.

What is claimed is:

1. A system of plumbing for a transportation conveyance, with one or more inlets for connection to pressurized and non-pressurized sources of water and one or more outlets for delivery of water for consumption within the conveyance, said system of plumbing comprising:

a water distribution manifold defining a system of conduits for flow of water therethrough, a shuttle valve comprising an elongated body and a set of spaced valve heads mounted therealong, said shuttle valve disposed within said water distribution manifold for movement among at least a first position, a second position and a third position for predetermined positioning of said valve heads relative to said system of conduits defined by said water distribution manifold, and said system of conduits defining one or more inlets for connection to the pressurized and non-pressurized sources of water, a heater outlet for flow of water from said system of conduits toward a water heater, at least one utility outlet for flow of water from said system of conduits for consumption within the transportation conveyance, and a drain port for flow of water from said system of plumbing.

2. The system of plumbing of claim 1 wherein said shuttle valve, in said first position, is adapted to permit flow of water from an inlet among said one or more inlets, through said system of conduits, toward a water storage tank.

3. The system of plumbing of claim 2 wherein said inlet among said one or more inlets is connected to a pressurized source of water.

4. The system of plumbing of claim 2 wherein said inlet among said one or more inlets is connected to a non-pressurized source of water.

5. The system of plumbing of claim 2 wherein, in said first position of said shuttle valve, a first said valve head is disposed in sealing engagement with a surrounding conduit wall of said water distribution manifold to resist flow of water within said system of conduits toward said drain port, and a second said valve head is disposed in sealing engagement with a surrounding conduit wall of said water distribution manifold to resist flow of water from an inlet coupled to said water heater toward said drain port.

6. The system of plumbing of claim 1 wherein said shuttle valve, in said second position, is adapted to permit flow of an inlet among said one or more inlets, through said system of conduits, to said heater and utility outlets.

7. The system of plumbing of claim 6 wherein said inlet among said one or more inlets is connected to a pressurized source of water.

8. The system of plumbing of claim 6 wherein said inlet among said one or more inlets is connected to a non-pressurized source of water.

9. The system of plumbing of claim 6 wherein, in said second position of said shuttle valve, a first said valve head is disposed in sealing engagement with a surrounding conduit wall of said water distribution manifold to resist flow of water from said system of conduits toward said drain port and a third said valve head is disposed in sealing engagement with a surrounding conduit wall of said water distribution manifold to resist flow of water from said system of conduits toward said inlet coupled to the non-pressurized source of water.

10. The system of plumbing of claim 1 wherein said shuttle valve, in said third position, is adapted to permit flow of water from said system of conduits through said drain port.

11. The system of plumbing of claim 10 wherein, in said third position of said shuttle valve, said first, second and third valve heads are spaced from sealing engagement with surrounding conduit walls of said water distribution manifold.

12. The system of plumbing of claim 1 wherein said drain port is disposed at a lowest point of said system of conduits and said system of plumbing.

13. The system of claim 1 further comprising a pump mounted adjacent said water distribution manifold and defining a pump inlet and a pump outlet, said pump, upon actuation, adapted to deliver water received at said pump inlet from said pump outlet under pressure.

14. A transportation conveyance having a system of plumbing with one or more inlets for connection to pressurized and non-pressurized sources of water and one or more outlets for delivery of water for consumption within the conveyance, said system of plumbing comprising:

a water distribution manifold defining a system of conduits for flow of water therethrough, a shuttle valve comprising an elongated body and a set of spaced valve heads mounted therealong, said shuttle valve disposed within said manifold for movement among at least a first position, a second position and a third position for predetermined positioning of said valve heads relative to surrounding conduit walls of said system of conduits, and said system of conduits defining one or more inlets for connection to pressurized and non-pressurized sources of water, a heater outlet for flow of water from said system of conduits toward a water heater, at least one utility outlet for flow of water from said system of conduits for delivery for consumption within the transportation conveyance, and a drain port for flow of water from said system of plumbing.

15. The transportation conveyance of claim 14 wherein said shuttle valve, in said first position, permits flow of water from an inlet among said one or more inlets, through said system of conduits, toward a water storage tank.

16. The transportation conveyance of claim 15 wherein said inlet among said one or more inlets is connected to a pressurized source of water.

17. The transportation conveyance of claim 15 wherein said inlet among said one or more inlets is connected to a non-pressurized source of water.

18. The transportation conveyance of claim 15 wherein, in said first position of said shuttle valve, a first said valve head is disposed in sealing engagement with a surrounding conduit wall of said water distribution manifold to resist flow of water within said system of conduits toward said drain port, and a second said valve head is disposed in sealing engagement with a surrounding conduit wall of said water distribution manifold to resist flow of water from an inlet coupled to said water heater toward said drain port.

19. The transportation conveyance of claim 14 wherein said shuttle valve, in said second position, is adapted to permit flow of an inlet among said one or more inlets, through said system of conduits, to said heater and utility outlets.

20. The transportation conveyance of claim 19 wherein said inlet among said one or more inlets is connected to a pressurized source of water.

21. The transportation conveyance of claim 19 wherein said inlet among said one or more inlets is connected to a non-pressurized source of water.

22. The transportation conveyance of claim 19 wherein, in said second position of said shuttle valve, a first said valve head is disposed in sealing engagement with a surrounding conduit wall of said water distribution manifold to resist flow of water from said system of conduits toward said drain port and a third said valve head is disposed in sealing engagement with a surrounding conduit wall of said water distribution manifold to resist flow of water from said system of conduits toward said inlet coupled to the non-pressurized source of water.

23. The transportation conveyance of claim 14 wherein said shuttle valve, in said third position, is adapted to permit flow of water from said system of conduits through said drain port.

24. The transportation conveyance of claim 23 wherein, in said third position of said shuttle valve, said first, second and third valve heads are spaced from sealing engagement with surrounding conduit walls of said water distribution manifold.

25. The transportation conveyance of claim 14 further comprising a pump mounted adjacent said water distribution manifold and defining a pump inlet and a pump outlet, said pump, upon actuation, adapted to deliver water received at said pump inlet from said pump outlet under pressure.

* * * * *

UNITED STATES PATENT AND TRADEMARK OFFICE
CERTIFICATE OF CORRECTION

PATENT NO.  : 5,507,310

DATED       : April 16, 1996

INVENTOR(S) : David L. Sordello et al.

It is certified that error appears in the above-identified patent and that said Letters Patent is hereby corrected as shown below:

Please add the following list of references under References Cited, U.S. Patent Documents:

```
2,638,924   5/1953    St. Clair        137/641
3,776,261   12/1973   Houghton         137/337
3,870,228   03/1975   Moseley, Jr.     237/59
4,469,131   09/1984   Traylor          137/599.1
4,491,150   01/1985   Holman et al.    137/565
```

Signed and Sealed this

Nineteenth Day of August, 1997

Attest:

Attesting Officer

BRUCE LEHMAN

Commissioner of Patents and Trademarks